United States Patent [19]
Han

[11] Patent Number: 6,109,054
[45] Date of Patent: Aug. 29, 2000

[54] AIR CONDITIONER

[75] Inventor: Chang-Ju Han, Suwon, Rep. of Korea

[73] Assignee: SamSung Electronics Co., Ltd., Suwon, Rep. of Korea

[21] Appl. No.: 09/240,573

[22] Filed: Feb. 1, 1999

[30] Foreign Application Priority Data

Apr. 1, 1998 [KR] Rep. of Korea ...................... 98-11500

[51] Int. Cl.[7] .................................................. F25D 17/04
[52] U.S. Cl. .............................................. 62/317; 62/298
[58] Field of Search ...................... 62/317, 298

[56] References Cited

U.S. PATENT DOCUMENTS 3,710,588  1/1973  Martinez ..................................... 62/317

Primary Examiner—William Doerrler
Assistant Examiner—Melvin Jones
Attorney, Agent, or Firm—Robert E. Bushnell, Esq.

[57] ABSTRACT

An air conditioner having at least more than one releasable electric dust collectors for collecting foreign objects such as dust and the like floating in the air sucked into a body of the air conditioner, the air conditioner comprising at least more than one accommodation member disposed at an air suction side of a body to accommodate at least more than one electric dust collector and rotatable in the body at a predetermined rotary angle (£) so as to lift at least more than one electric dust collector from the body from a predetermined slant direction so that the electric dust collector can be easily drawn out of and inserted into the body, whereby the electric dust collectors is constructed in scroll type of reduced weight and volume and is slidingly rotated at a predetermined angle in the body, and easily and releasably accommodated by at least one of the accommodation members having an upper opening thereon, so that a user can easily lift up one of the electric dust collectors for cleaning, and the electric dust collectors can be readily attached to or detached from the accommodation member without stopping to pick up.

11 Claims, 9 Drawing Sheets

AIR CONDITIONER

BACKGROUND OF THE INVENTION

1. Field of the Invention

The present invention relates to an air conditioner, and more particularly to an air conditioner adapted to improve a coupling status of an electric dust collector disposed at a lower suction inlet to thereby make it easy to attach and detach the dust collector to and from the air conditioner.

2. Description of the Prior Art

A conventional air conditioner is disposed, as illustrated in FIGS. 1, 2 and 3, with a suction grille member 20 having a plurality of suction holes 21, a discharge outlet 30, and a plurality of vertical blades 40 and horizontal blades 50. The air conditioner is also provided with a body 10 for forming an external appearance, which is further arranged with a manipulating unit 60, blowing means 70 and a plurality of heavy and bulky electric dust collectors 80 releasably mounted to the body 10.

At this time, the blowing means 70 includes a motor 71, a blower fan 73, and a duct 74. Each electric dust collector 80 (hereinafter to be referred to as duster) is made of wide-bodied plate type by which the duster is installed on an upper surface of a fixed rail 11 fixed crosswise on an inner wall of the body 10.

However, there is a problem in the conventional air conditioner thus constructed in that the plurality of dusters 80 disposed on a plurality of fixed rails 11 are horizontally drawn out from the body 10 for cleaning (as illustrated in FIG. 3) or inserted thereinto for assembly (as illustrated in FIG. 2), thereby incurring an inconvenience to a user in handling the heavy and bulky dusters. There is another problem in that the dusters are not easily detached from and attached onto the rails 11.

SUMMARY OF THE INVENTION

The present invention is disclose to solve the aforementioned problems and it is an object of the present invention to provide an air conditioner adapted to reduce weight and size of a plurality of dusters in scroll type, thereby allowing a user to easily handle the dusters for cleaning. It is another object of the present invention to provide an air conditioner adapted to arranged an accommodation member which is rotatably slid to be opened and closed at an upper area thereof, thereby allowing the user to easily detach and attach the duster from and to the body of the air conditioner.

In accordance with the objects of the present invention, there is provided an air conditioner having at least more than one releasable electric dust collectors for collecting foreign objects such as dust and the like floating in the air sucked into a body of the air conditioner, the air conditioner comprising at least more than one accommodation member disposed at an air suction side of a body to accommodate at least more than one electric dust collector and rotatable in the body at a predetermined rotary angle (£) so as to lift at least more than one electric dust collector from the body from a predetermined slant direction so that the electric dust collector can be easily drawn out of and inserted into the body.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
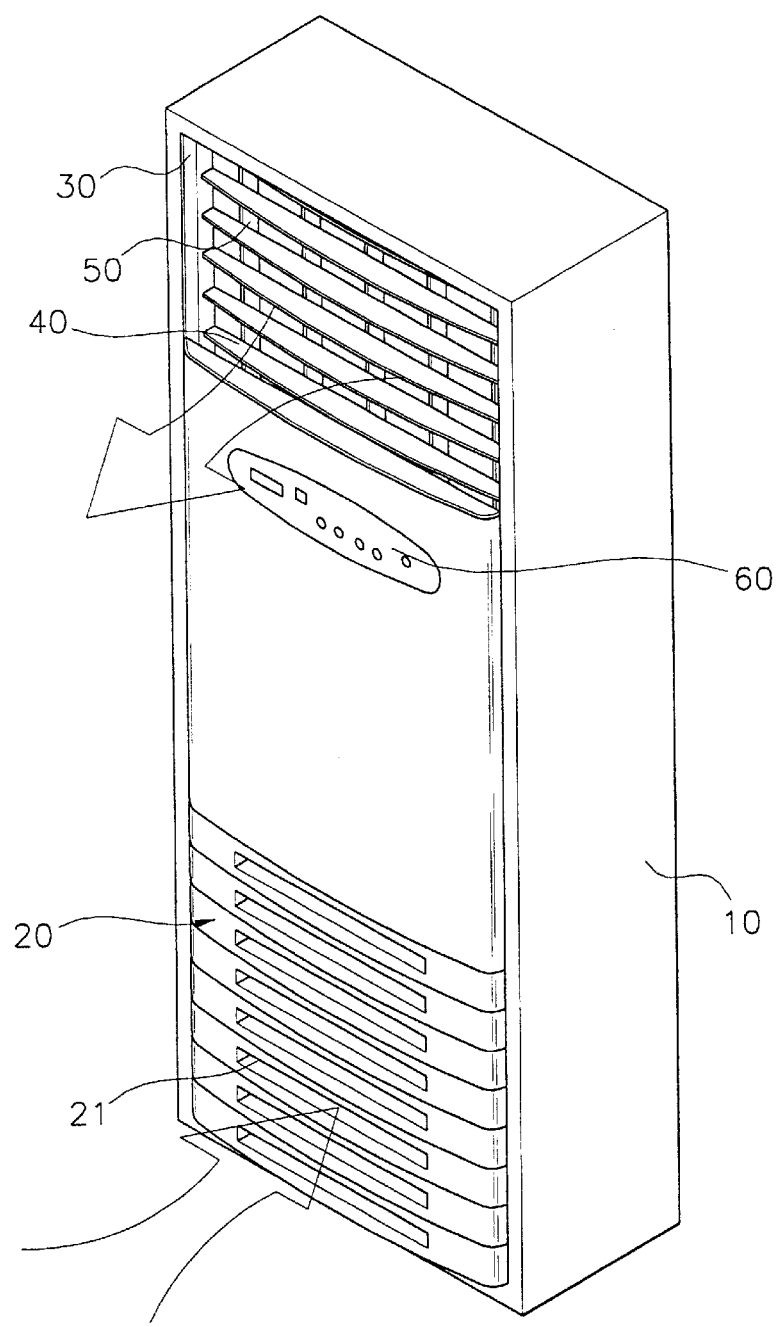
FIG. 1 is a perspective view for illustrating an external appearance of an air conditioner according to the prior art.
Figure 2:
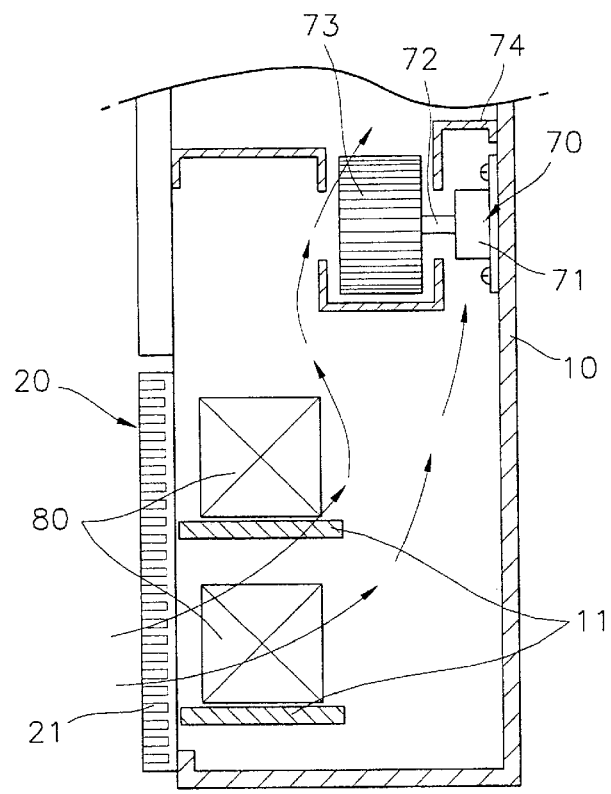
FIG. 2 is a side sectional view for illustrating a coupling status of an electric dust collector according to the prior art.
Figure 3:
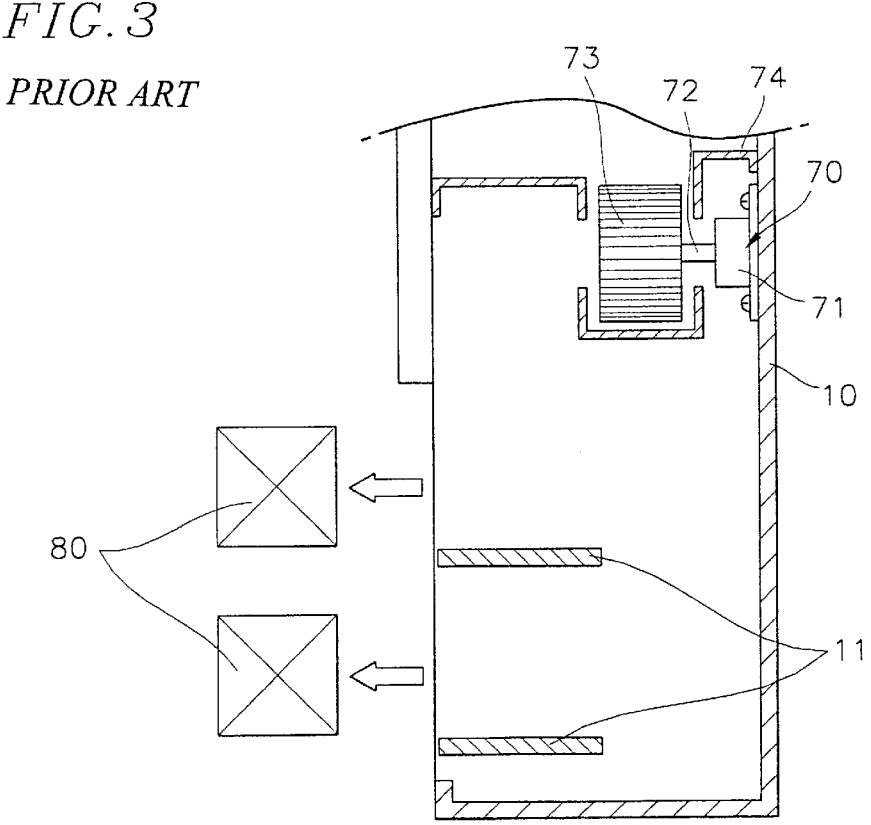
FIG. 3 is a side sectional view for illustrating a detached status of an electric dust collector according to the prior art.
Figure 4:
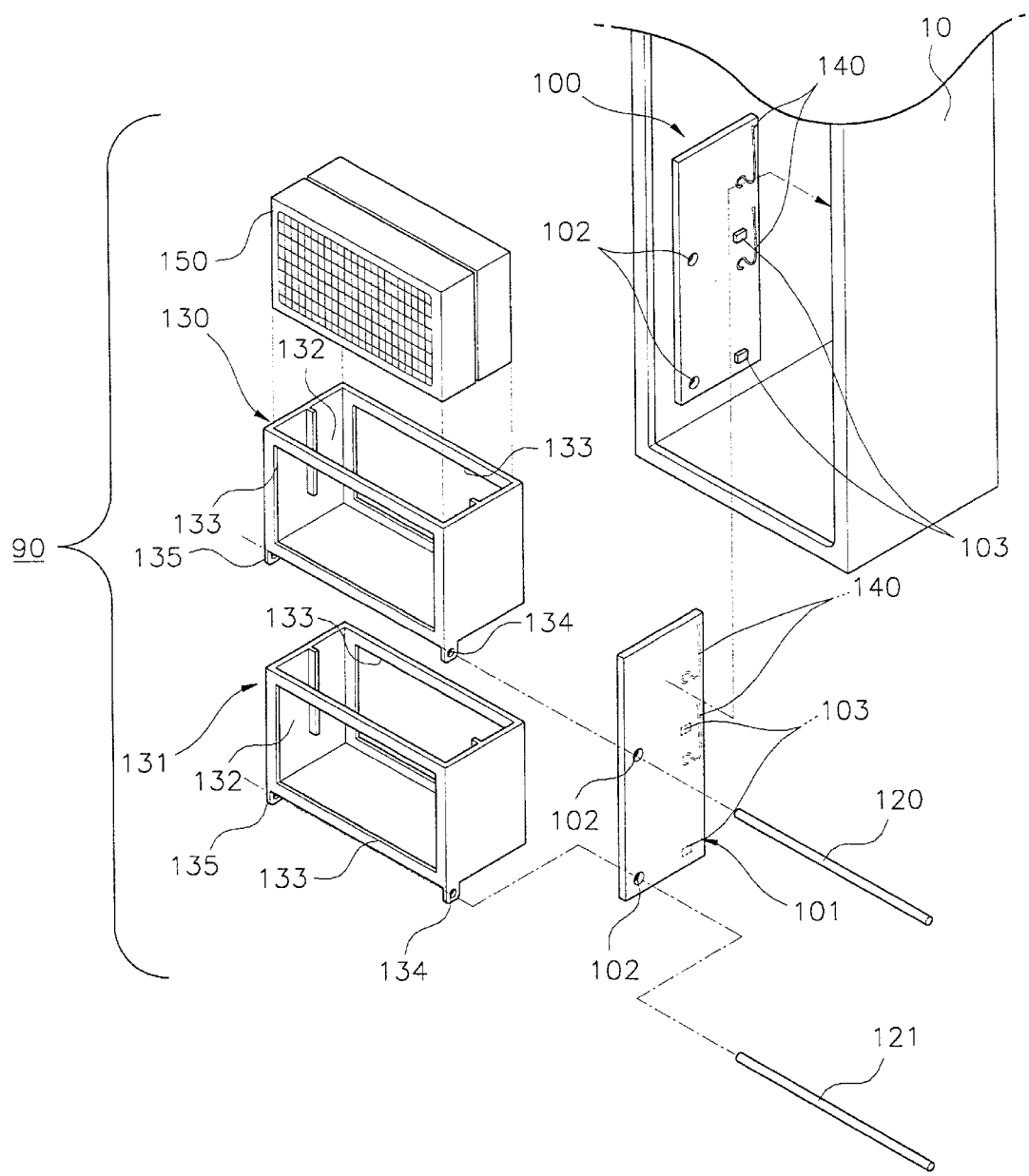
FIG. 4 is an exploded perspective view for illustrating an electric dust collector according a first embodiment of the present invention.

Now, the first embodiment of the present invention will be described in detail with reference to the accompanying drawings 4, 5, 6 and 7.

Throughout the drawings, like reference numerals and symbols are used for designation of like or equivalent parts or portions and redundant references will be omitted for simplicity of illustration and explanation.

Electric dust collecting means 90 according to the present invention includes a plurality of support frames 100 and 101 disposed at both inner walls of a body 10, at least one accommodation member 130 or 131 for being hinged at a lower end thereof via a plurality of hinges axes 120 and 121 toward up and down direction against the support frames 100 and 101, a connecting member 140 for connecting between rear ends of the plurality of support frames 100 and 101 and upper rear ends of the accommodation members 130 and 131 so that at least one accommodation member 130 or 131 is slantly rotated at an upper side thereof toward an external side of the body 10 at a predetermined angle to thereafter be stopped, and at least one electric dust collector 150 and 151 formed in a pair of less weighty and less bulky scroll types so as to be attached into and detached from at least one accommodation member 130 or 131 via an upper opening of at least one accommodation member 130 or 131.

At this time, the plurality of support frames 100 and 101 are disposed at intermediate height and lower height thereof with hinge holes 102 so that a plurality of hinge axes can freely be coupled thereinto and are integrally mounted with stopper 103 at the same heights as those of hinge holes 102 to stop the rotation of the accommodation members 130 and 131 when the members 130 and 131 are rotated backward. The plurality of hinge axes 120 and 121 are of round long rods which pass through hinge holes (described later) of the accommodation members 130 and 131 to be coupled to the hinge holes 102 of the plurality of support frames 100 and 101.

The accommodation members 130 and 131 are respectively formed at upper surfaces thereof with openings 132 for the electric dust collectors 150 and 151 to be inserted for coupling and detachment, and disposed at front and rear surfaces thereof with ventilation holes 133, and are integrally arranged at both bottom front ends thereof with hinge pieces 135 centrally having hinge holes 134 for the plurality of hinge axes 120 to pierce therethrough and to be inserted into hinge holes 102 for coupling. The accommodation members 130 and 131 are angled at $30°\leq\alpha\leq50°$ when they are rotated to be vertically or horizontally positioned, where $\alpha$ is rotary angle. The connecting member 140 may be made of iron chain or lace for easy hinge operation.

One electric dust collector 150 is made of a pair of less bulky and less weighty scroll type and is attached and detached via the opening 132 formed at an upper surface of one accommodation member 130 and the other electric dust collector 151 is also made of a pair of less bulky and less weighty scroll type and is attached and detached via the opening 132 formed on the upper surface of the other accommodation member 131.

At this time, at least one of the electric dust collectors 150 and 151 is guided by one of the accommodation members 130 and 131 when one of the electric dust collectors 150 and 151 is mounted at front or rear inner side of the accommodation members 130 or 131.

Now, operational effect of the present invention thus constructed will be described.

When a motor 71 at blowing means 70 disposed in the body 10 is activated, a blowing fan 73 is rotated via a motor axis 72. The air is forcibly sucked into the body 10 via a suction hole 21 at the suction grille member 20 mounted underneath the body 10. The air is again discharged into the room via a discharge outlet 30 formed at an upper front side of the body 10, where the cycle of the air being sucked and discharged is repeated.

At this time, the air sucked into the body 10 via the suction hole 21 at the suction grille member 20 passes through a discharge plate (not shown) at the electric dust collectors 150 and 151 and a charge plate (not shown) to electrically collect foreign objects such as dust and the like floating in the air, so that only clean air is passed.

In other words, at least one of the electric dust collectors 150 and 151 receives a high voltage simultaneously, a few minutes before or a few minutes after the motor 71 at the blowing means 70 is driven, at which time, the discharge plate (not shown) generates radiating waves to disintegrate the dust and the like floating and passing through the discharge plate (not shown) and the charge plate (not shown) into fine particles. The ionized (+) dust is absorbed and removed by the charge plate (not shown) having an electric charge (-) to thereby allow only the clean air to be passed.

Figure 6:
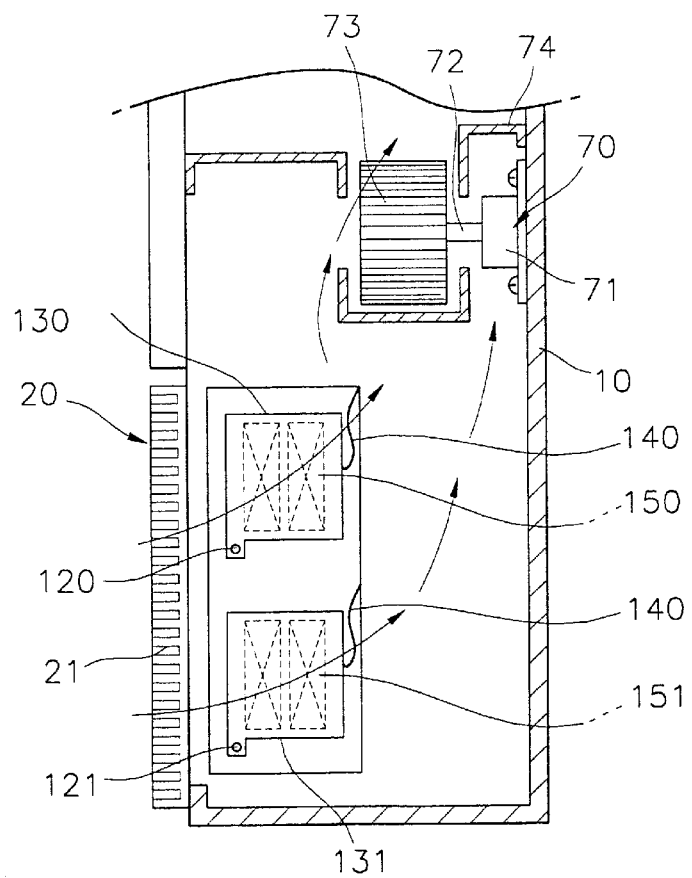
FIG. 6 is a side sectional view for illustrating a coupling status of an electric dust collector according to FIG. 4.

Meanwhile, in order to detach one of the electric dust collectors 150 and 151 disposed in one of the accommodating members 130 and 131 for cleaning thereof, first of all, the suction grille member 20 is detached from the body 10 in FIG. 6, a bottom front side of the body 10 is opened and an upper end of one of the accommodation members 130 and 131 is forwardly pulled.

One of the accommodation members 130 and 131 is hinged in the hinge hole 134 and rotated at a predetermined angle around the plurality of hinge axes 120 and 121.

Figure 7:
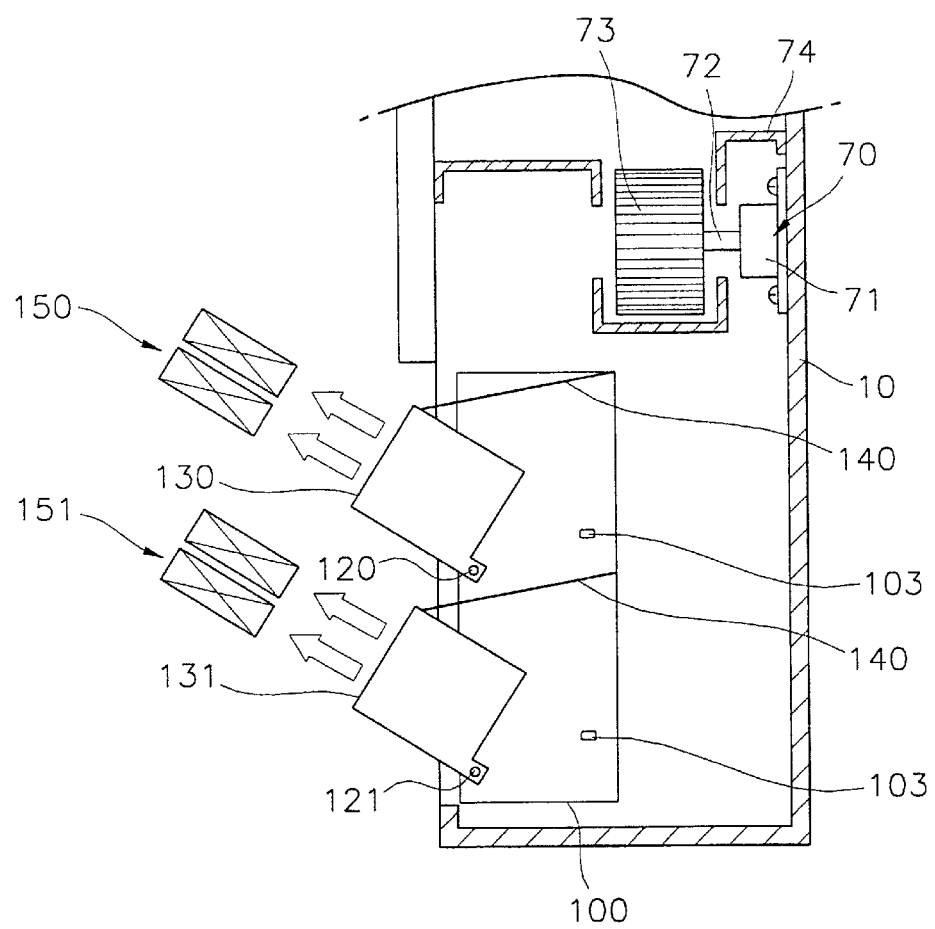
FIG. 7 is a side sectional view for illustrating a detached status of an electric dust collector according to FIG. 4.

In other words, the accommodation members 130 or 131 is no longer rotated and slantly stopped at a predetermined angle, as illustrated in FIG. 7 by flexible connecting member 140, such that the opening 132 formed on the upper surface of the accommodation member is exposed out of the body 10.

At this time, when the electric dust collector 150 or 151 is lifted through the opening 132, the electric dust collector 150 or 151 escapes interference of the body 10 according to the rotary openness angle ($\alpha$) of the accommodation member 130 or 131 to thereafter be easily detached. By which a user can dust collected in the detached electric dust collector 150 or 151.

Furthermore, in order to accommodate at least one of the electric dust collectors 150 and 151 into at least one of the accommodation members 130 and 131 and into the body 10 after cleaning, one of the electric dust collectors 150 and 151 is inserted through the upper opening 132 of the accommodation member 130 and 131 slantly opened for detachment of the electric dust collector 150 or 151, in the reverse way of attachment, and thereafter the accommodation 130 or 131 is pushed backward at the upper end thereof.

Figure 5:
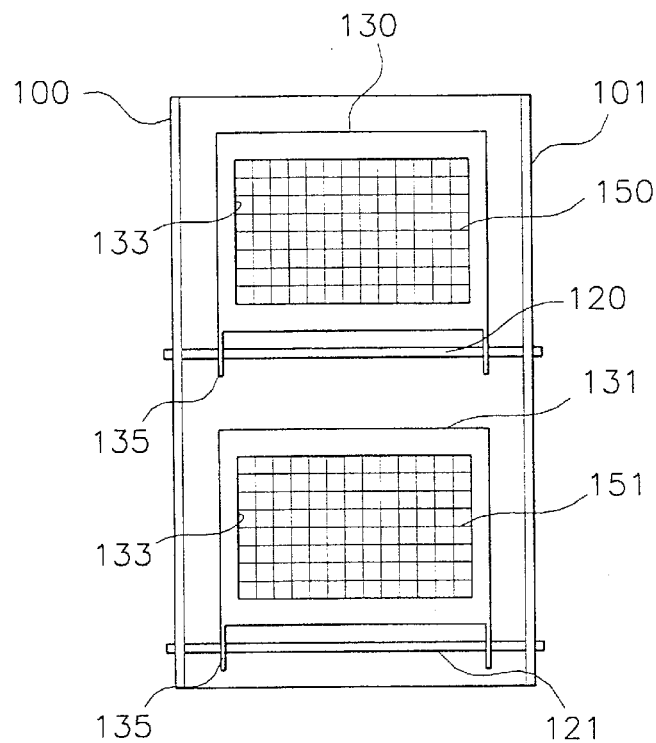
FIG. 5 is a plane view for illustrating a coupling status of an electric dust collector according to FIG. 4.

At this time, at least one of the accommodation members is rotated backward around the plurality of hinge axes 120 and 121 and is stopped at a bottom rear side thereof by the stopper 103 disposed at a predetermined position of the support frames 100 and 101 to thereafter be vertically positioned as illustrated in FIG. 5. At least one of the electric dust collectors 150 and 151 disposed in parallel, each at a predetermined interval at front and rear sides of the accommodation members 130 and 131 is vertically positioned at right angle against the suction direction of the air.

There are advantages therefore in the air conditioner according to the present invention in that at least one of electric dust collectors 150 and 151 is constructed in a pair of scroll type having reduced weight and volume, and is accommodated into at least one of the accommodation members 130 and 131 slidingly rotated at a predetermined angle in the body 10, such that the electric dust collectors can be easily lifted and cleaned by a user, and can be readily assembled to and detached from one of the accommodation members 130 and 131.

Figure 8:
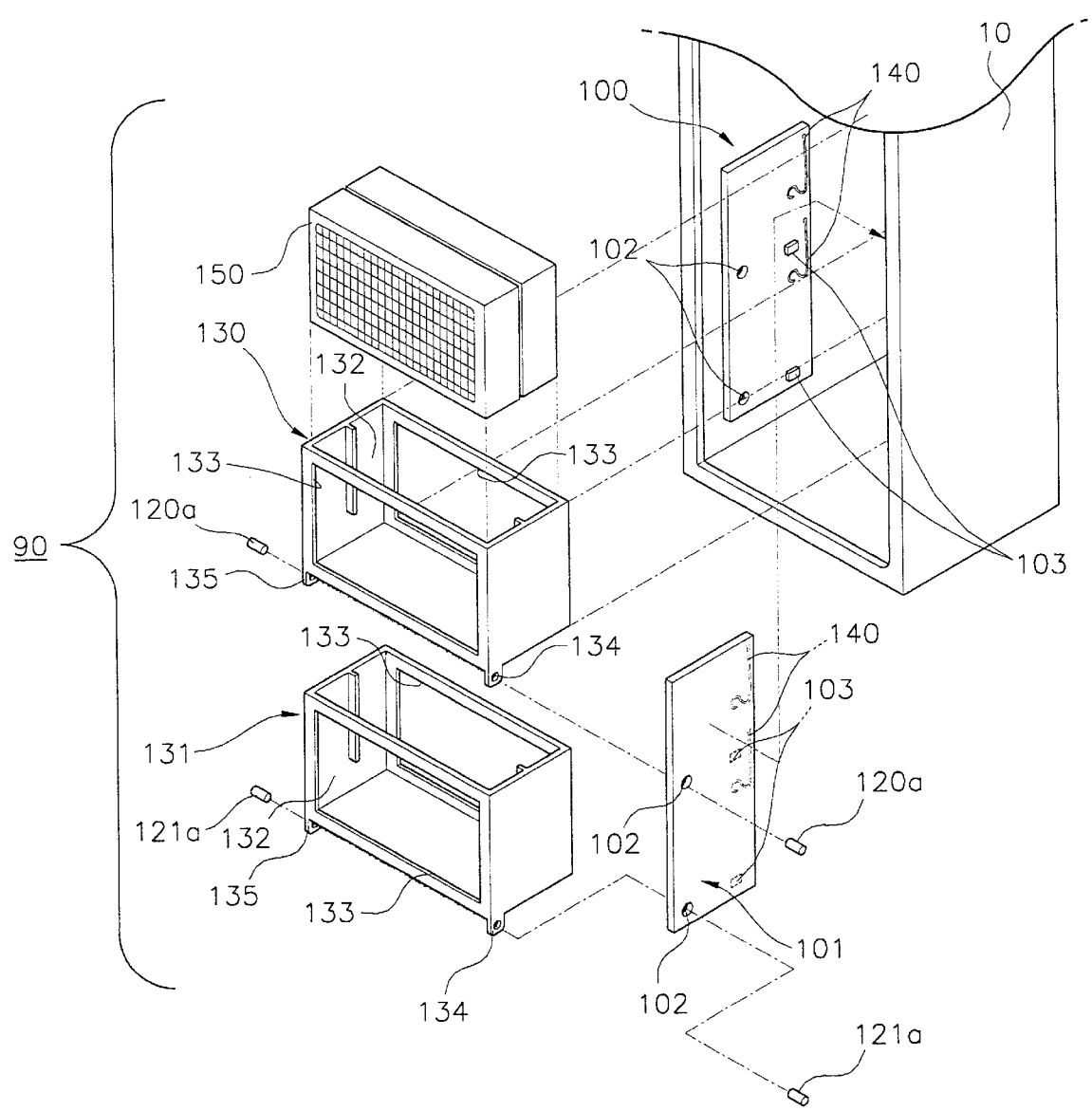
FIG. 8 is an exploded perspective view for illustrating an electric dust collector according to a second embodiment of the present invention.
Figure 9:
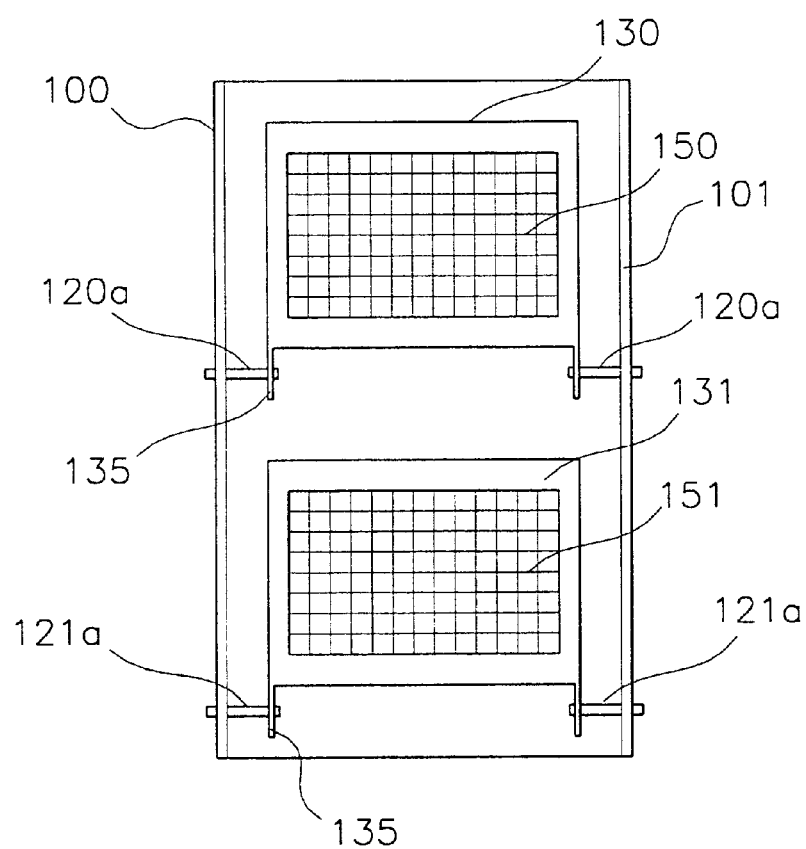
FIG. 9 is a plane view for illustrating a coupling status of an electric dust collector according to FIG. 8.

In the above-mentioned first embodiment of the present invention, it is described that one side of the plurality of hinge axes 120 and 121 pass through the hinge hole 134 formed at the hinge piece 135 of at least one of the accommodation members 130 and 131 while the other side is coupled to the hinge hole 102 formed at the support frame 101. However, the present is not limited by the above-mentioned first embodiment. For example, as a second embodiment given in FIGS. 8 and 9, a plurality of hinge axes 120$a$ and 120$b$ may be shortened in length thereof and divided into two pieces, so as to be respectively connected to the hinge holes 134 formed at both front bottom sides of the accommodation members 130 and 131 and to hinge hole 102 formed at the plurality of support members 100 and 101.

Figure 10:
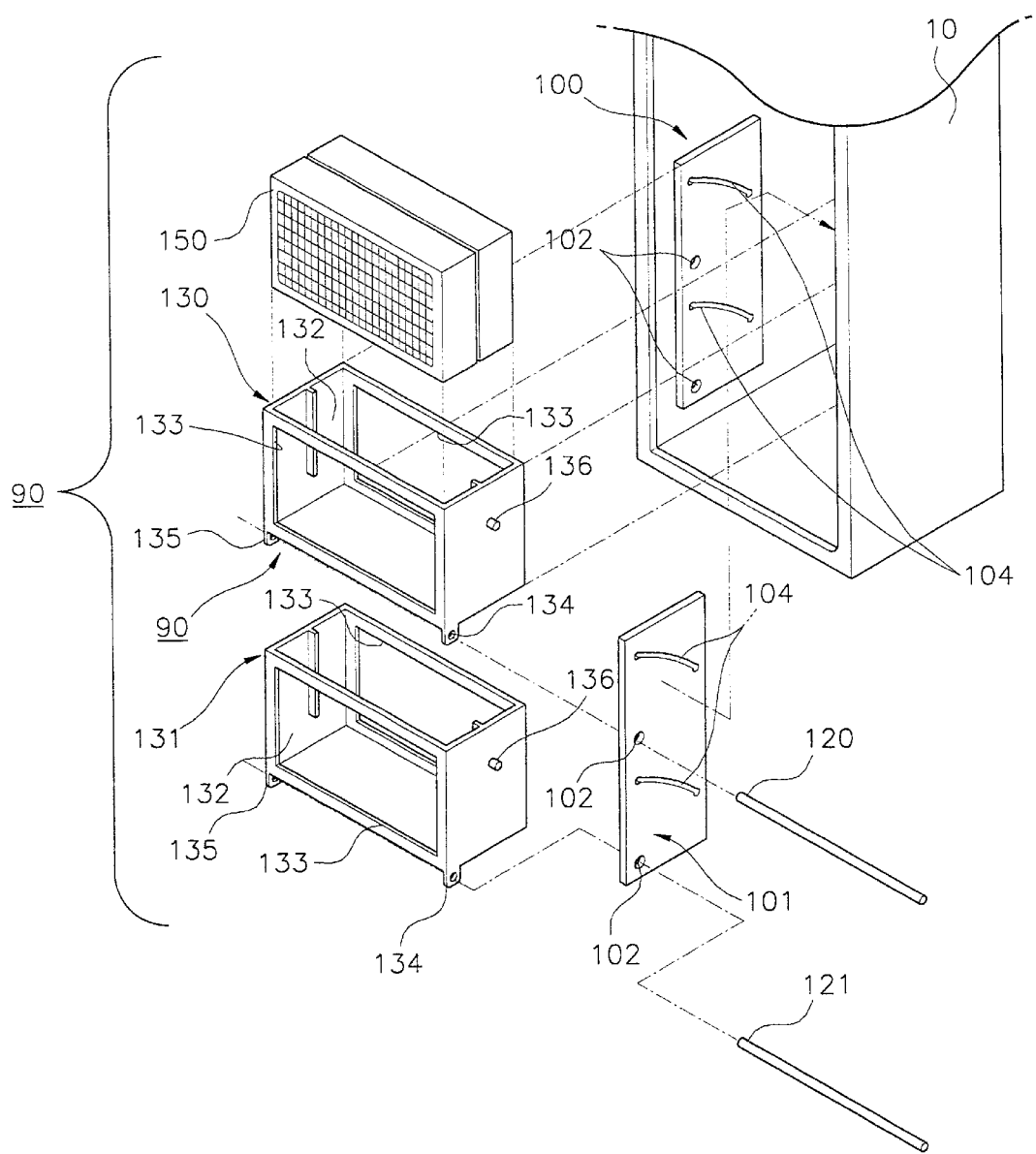
FIG. 10 is an exploded perspective view for illustrating an electric dust collector according to a third embodiment of the present invention.
Figure 11:
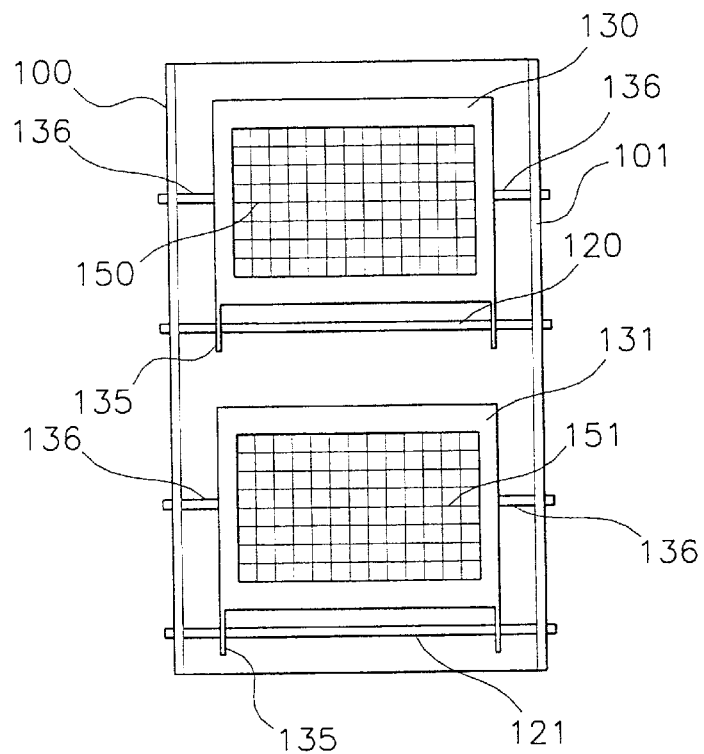
FIG. 11 is a plane view for illustrating a coupling status of an electric dust collector according to FIG. 10.
Figure 12:
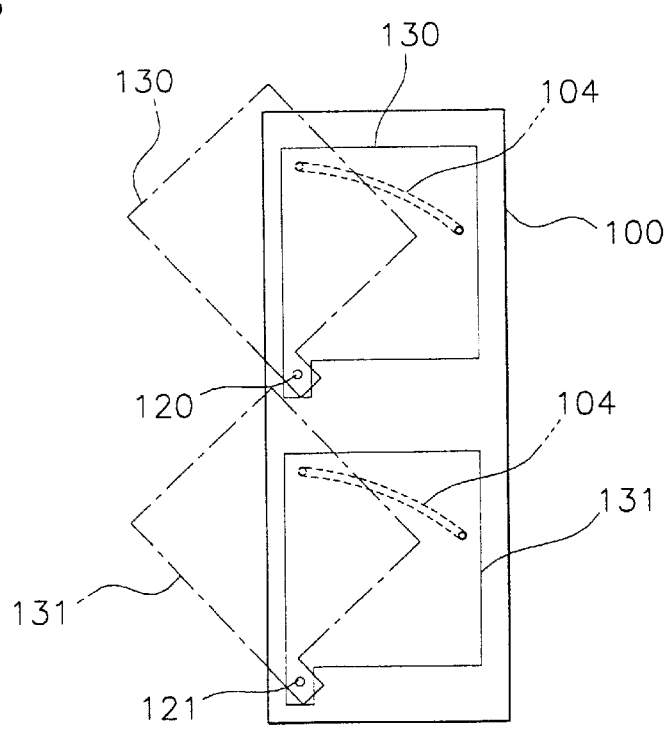
FIG. 12 is a side view for illustrating an operational status of an electric dust collector according to FIG. 11.

Furthermore, in the above-mentioned embodiment of the present invention, it is described that a connecting member 140 is connected between upper rear end of the accommodation members 130 and 131 and rear end of the plurality of support members 100 and 101 so that the upper side of the accommodation members 130 and 131 is slantingly rotated at a predetermined angle toward an external side of the body 10 and stopped. However, the present invention is not limited by the above-mentioned embodiment. For example, as a third embodiment illustrated in FIGS. 10, 11 and 12, the connecting member 140 may be eliminated, and instead guide grooves 104 are respectively formed at upper most and lower most positions of the plurality of support frames 100 and 101, and a guide axis 136 is horizontally protruded so as to be inserted into the guide grooves 104 at both external sides of the accommodation members 130 and 131, slid back and forth and to cause the accommodation members 130 and 131 to be opened or closed at a predetermined angle.

As apparent from the foregoing, there is an advantage in the air conditioner according to the present invention in that at least one of the electric dust collectors is constructed in scroll type of reduced weight and volume and is slidingly rotated at a predetermined angle in the body, and easily and releasably accommodated by at least one of the accommodation members having an upper opening thereon, so that a user can easily lift up one of the electric dust collectors for cleaning, and the electric dust collectors can be readily attached to or detached from the accommodation member without stopping to pick up.

What is claimed is:

1. An air conditioner having at least more than one releasable electric dust collectors for collecting foreign objects such as dust and the like floating in the air sucked into a body of the air conditioner, the air conditioner comprising at least more than one accommodation member disposed at an air suction side of a body to accommodate at least more than one electric dust collector and rotatable in the body at a predetermined rotary angle (£) so as to lift at least more than one electric dust collector from the body from a predetermined slant direction so that the electric dust collector can be easily drawn out of and inserted into the body.

2. The air conditioner as defined in claim 1, wherein at least one of the accommodation members is rotatably supported at both bottom front ends thereof by a plurality of support frames respectively fixed to both walls in the body and a plurality of hinge axes respectively fixed to one support frame formed at one side and the other support frame disposed at the other side.

3. The air conditioner as defined in claim 2, wherein the plurality of hinge axes are respectively constructed each in a long rod, one end of which piercing through a hinge hole formed at each front bottom end of accommodation member to be fixed to one side wall of one support frame and the other end of which being fixed to the other wall of the other support frame.

4. The air conditioner as defined in claim 2, wherein the plurality of support frames are respectively formed at predetermined heights with stoppers, so that, when the accommodation members are rotated backward, the stoppers prevent the accommodation members at vertical direction.

5. The air conditioner as defined in claim 1, wherein the accommodation member is protrudingly and horizontally disposed at each external wall thereof with a guide axis for limiting the rotary angle ($\alpha$) so that the accommodation member is slid to open or to close while the guide axis is inserted and slid back and forth in a guide groove formed at the support frame at a predetermined height.

6. The air conditioner as defined in claim 1, wherein a connecting member is disposed between the accommodation member and the support member so that the accommodation member is slantingly rotated at a predetermined angle and stopped to a position where the electric dust collector is detached and coupled.

7. The air conditioner as defined in claim 6, wherein the connecting member is made of iron chain or a kind of lace for each folding and unfolding.

8. The air conditioner as defined in claim 1, wherein the accommodation member comprises:

an opening for the electric dust collector to be inserted thereinto for coupling or separation;

a ventilation hole for the air to pass; and a hinge piece centrally disposed with hinge hole so that the plurality of hinge axes can pass therethrough.

9. The air conditioner as defined in claim 1, wherein the electric dust collectors are accommodated in parallel each at a predetermined interval lest they should be in touch therebetween.

10. The air conditioner as defined in claim 1, wherein the rotary angle ($\alpha$) of the accommodation member is $30° \leq \alpha \leq 50°$.

11. The air conditioner as defined in claim 1, wherein the electric dust collector is constructed in scroll type of reduced weight and volume.

* * * * *